United States Patent [19]

Marcoux

[11] Patent Number: 4,589,206

[45] Date of Patent: May 20, 1986

[54] SLICING KNIFE AND BOARD

[76] Inventor: Emery Marcoux, 53, chemin du Grand Moulin, Deux-Montagnes, Canada, J7R 3C3

[21] Appl. No.: 653,207

[22] Filed: Sep. 24, 1984

[51] Int. Cl.⁴ .......................... A21C 15/04; B26B 3/03
[52] U.S. Cl. ........................................ 30/114; 30/280; 83/762
[58] Field of Search ................. 30/289, 282, 283, 280, 30/114; 83/762, 763, 764, 761

[56] References Cited

U.S. PATENT DOCUMENTS

| | | | |
|---|---|---|---|
| D. 136,182 | 8/1943 | Oliver | 30/283 X |
| 280,796 | 7/1883 | Chapman | 83/761 |
| 508,916 | 11/1893 | Christy | 30/283 |
| 1,072,450 | 9/1913 | Hamblin | 83/762 |
| 1,405,720 | 2/1922 | Scott | 83/762 |
| 2,043,175 | 6/1936 | Johnson | 83/761 |
| 2,301,737 | 11/1942 | Miller | 30/283 |
| 2,355,755 | 8/1944 | Simmons | 30/283 |
| 2,358,210 | 9/1944 | Brownsey | 30/283 X |
| 2,398,192 | 4/1946 | Scheminger, Jr. | 83/761 |
| 2,453,220 | 11/1948 | Gustafson | 30/283 |
| 2,856,688 | 10/1958 | Kopel | 30/283 |
| 2,876,539 | 3/1959 | Ford | 30/283 |
| 3,987,541 | 10/1976 | Sieczkiewicz | 30/114 |
| 4,085,642 | 4/1978 | Birmingham | 83/764 |
| 4,383,365 | 5/1983 | Metzigian | 30/114 |

FOREIGN PATENT DOCUMENTS

| | | |
|---|---|---|
| 99022 | 3/1906 | Canada . |
| 162272 | 2/1915 | Canada . |
| 427279 | 8/1945 | Canada . |
| 1040075 | 10/1978 | Canada . |

Primary Examiner—Jimmy C. Peters

[57] ABSTRACT

There is disclosed an assembly of a slicing knife, support board and a holding strap cooperatively arranged for slicing a mass of foods, such as a loaf of bread, into slices of equal thickness. The support board includes a bottom having an upwardly-extending abutment wall at one end and upwardly-extending lateral guides adjacent said abutment wall, each guide having a knife blade-receiving guide slot spaced forwardly of the abutment wall a distance corresponding to the thickness of the slices to be obtained. The guide slots are in transverse registry. The holding strap forms a loop upwardly extending from the bottom and is engageable around the loaf of bread to prevent its deformation during the slicing operation. The knife includes a blade held under tension by a bow frame. The knife blade is co-axial with the knife handle to prevent twisting of the blade during slicing. The bottom of the handle is upwardly shifted relative to the lower edge of the blade to prevent the user's fingers from touching the table or counter surface at the end of the slicing operation. The handle may be secured to either end of the bow frame for use by left-handed as well as right-handed users. The support board is also arranged for both types of users. A special knife handle is provided for users in wheel-chairs.

21 Claims, 18 Drawing Figures

U.S. Patent   May 20, 1986   Sheet 1 of 5   4,589,206
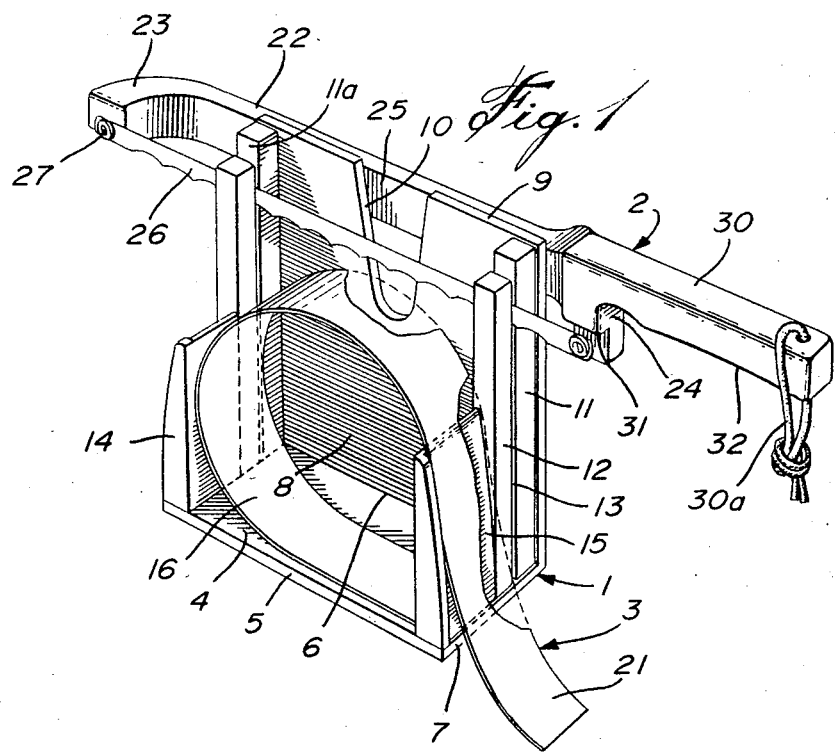
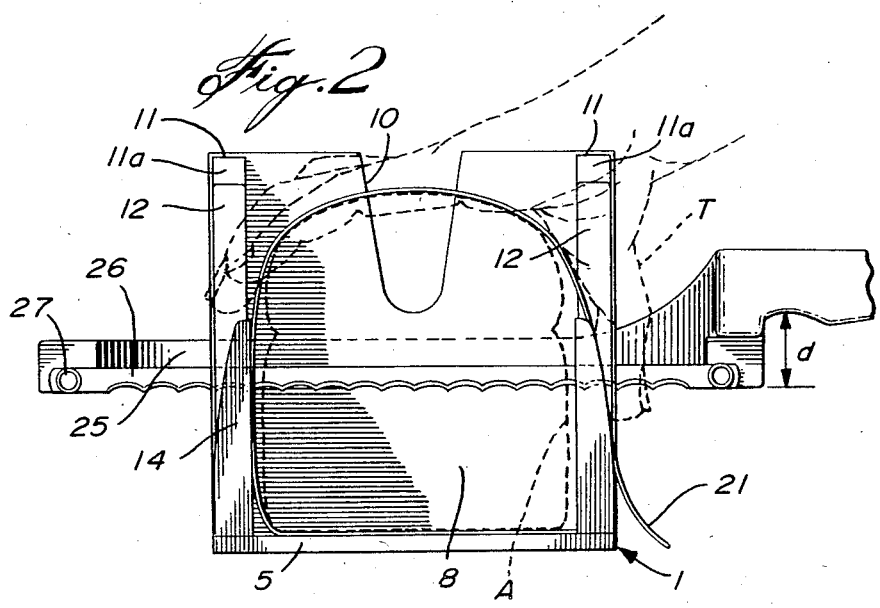

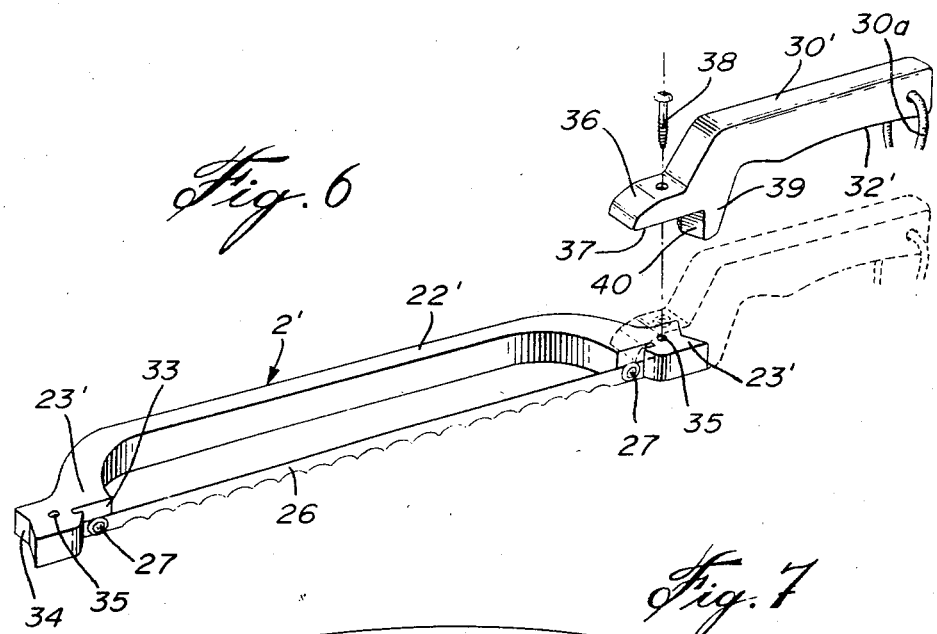
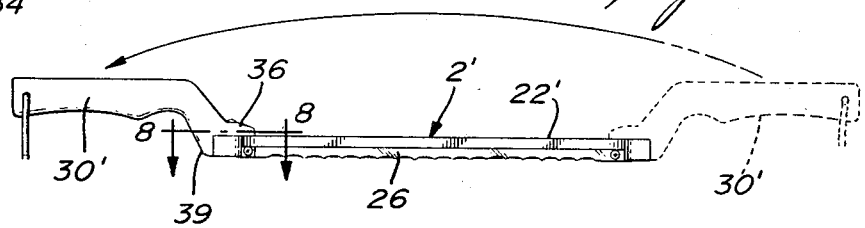
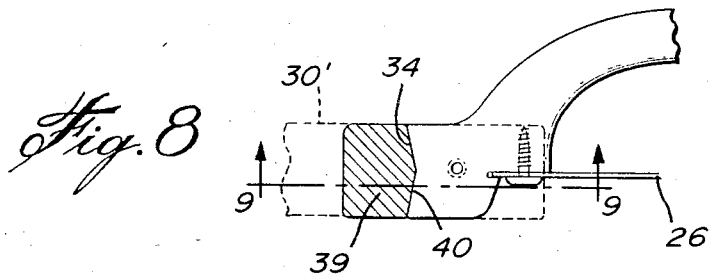
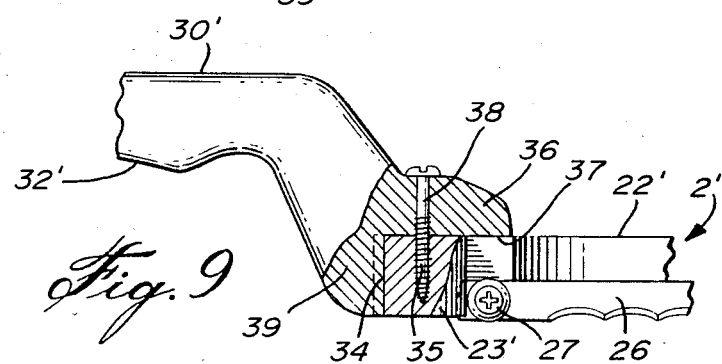

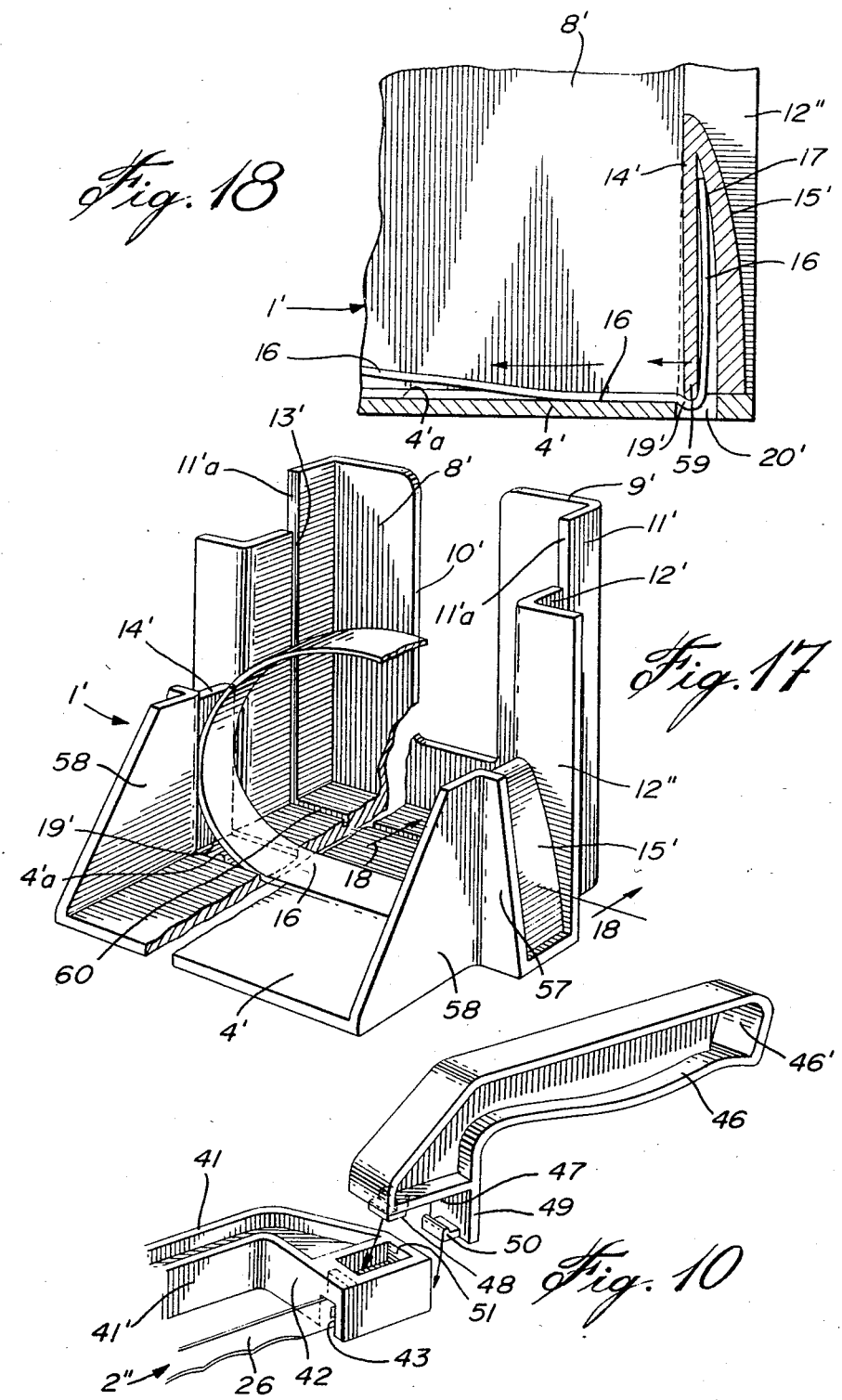

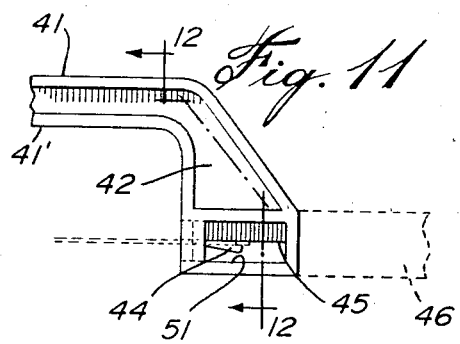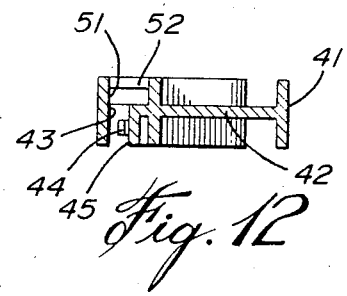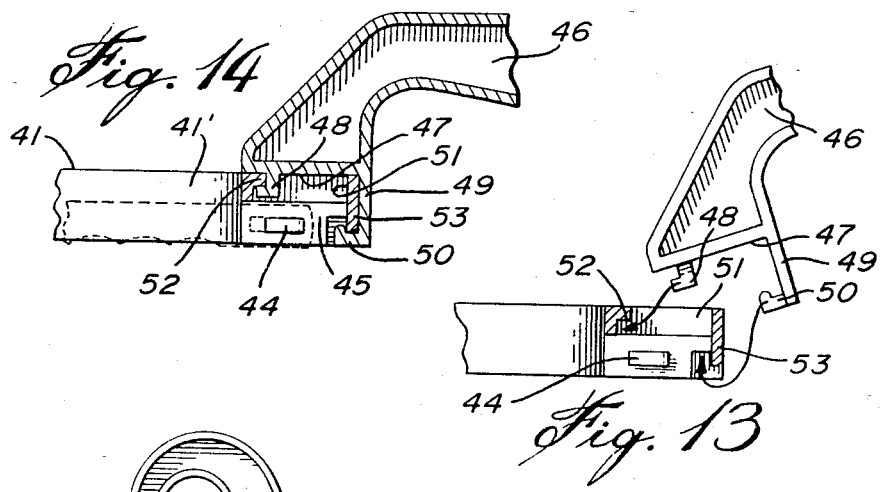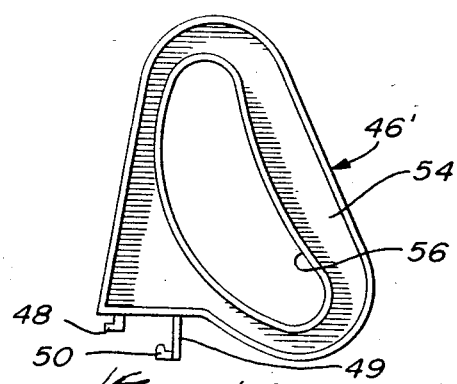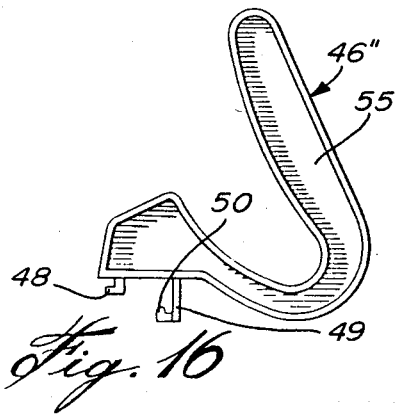

4,589,206

1

SLICING KNIFE AND BOARD

FIELD OF THE INVENTION

The present invention relates to a knife and holder assembly cooperatively constructed and arranged for slicing a mass of food, such as a loaf of bread, into slices of equal thickness.

BACKGROUND OF THE INVENTION

It is well known that a bread knife, of the type in which a thin blade is held under tension by a bow frame, is much more efficient than a thicker blade with a handle fixed to one end of the blade. Known slicing knives of this type have the disadvantage that the user's fingers come into abutment with a support surface at the end of the slicing operation and that the blade tends to twist, because the long axis of the handle is laterally offset from the plane of the blade.

Known support boards for holding a mass of food, such as a loaf of bread during the slicing operation and for cutting slices of equal thickness, are not adapted to be used with a slicing knife of the above-noted type. Moreover, such support boards are usually meant to extend under a whole loaf of bread, with the result that they have a substantial size and are therefore not very convenient for use on kitchen counters, which very often have not very much space to spare.

OBJECTS OF THE INVENTION

It is a general object of the invention to provide a knife of the type in which the blade is held under tension by a bow frame and which will overcome the above-noted disadvantages.

It is another object of the invention to provide a support board for slicing a mass of food into slices of equal thickness, which board is adapted to be used in association with the above-noted knife.

It is another object of the invention to provide a slicing knife adapted for use by a right-handed as well as a left-handed user.

It is another object of the invention to provide a slicing knife with a special handle for use on a kitchen couter by persons in a wheel-chair.

It is another object of the present invention to provide a support board suitable for use with a knife of the above-noted type.

It is another object of the invention to provide a support board which has means to prevent deformation of the mass of food during slicing.

It is another object of the invention to provide a slicing board of the character described, which can be used by right-handed as well left-handed users.

Another object of the invention is to provide a support board which is short, so as to engage under the front portion of a loaf of bread to be sliced, so that the board has minimum dimensions and will occupy only a small proportion of a kitchen counter.

Another object of the invention is to provide a slot in the abutment plate of the support board to facilitate removal of a just-cut bread slice from between the loaf of bread and the abutment plate.

SUMMARY OF THE INVENTION

The slicing knife includes a resilient bow frame defining a pair of opposite ends, having means to attach thereto the ends of a blade held under tension, a handle protruding from one end of the bow frame and having its longitudinal axis in the plane of the blade and having its underface upwardly shifted from the straight line joining the blade teeth. Preferably, the handle is removable and there are provided attachment means for securing the handle to either end of the bow frame for right-hand and left-hand use. The handle may have a shape upstanding from the bow frame for convenient use at the level of a kitchen counter by a person in a wheelchair. The support board comprises a short base plate having an upstanding abutment wall at its rear end and upstanding lateral guides adjacent said abutment plate or wall, each guide having a vertical slot extending upwardly from the base plate and opening at the free ends of the guides, the slots being in a plane parallel to the abutment wall and at a distance selected in accordance with the thickness of the slice to be cut, the distance between the slots and the outer surface of the abutment wall being equal to or smaller than the distance between the blade and the bow frame, so that the slots can accommodate the blade of the above-noted slicing knife. The support board further includes a strap member arranged to form a loop around the loaf of bread being sliced to hold the latter against deformation. Preferably, one end of the strap is attached to the support board, while the free end of the strap is arranged to be applied by a user's finger against a rest surface formed by the support board. Preferably also, the position of the strap may be reversed with respect to the support board to adapt the latter to left-hand or right-hand operation. Preferably, the abutment wall has a top notch for ease in removal of a freshly-cut slice of bread.

BRIEF DESCRIPTION OF THE DRAWINGS

FIG. 1 is a perspective view of a first embodiment of the slicing knife and of the support board in accordance with the invention;

FIG. 2 is an end elevation of the assembly of FIG. 1 showing in dotted lines a loaf of bread and a user's hand in operative position;

FIG. 6 is an exploded perspective view of a second embodiment of the knife;

FIG. 7 is a side view of the knife of FIG. 6, with the handle attached to the opposite end of the bow frame:

FIG. 8 is a partial plan section taken along line 8—8 of FIG. 7.

FIG. 9 is a vertical partial section taken along line 9—9 of FIG. 8;

FIG. 10 is a partial exploded perspective view of a third embodiment of the slicing knife;

FIG. 11 is a top plan view of the part of the bow frame shown in FIG. 10;

FIG. 12 is a section taken along line 12—12 of FIG. 11;

FIG. 13 is a longitudinal section of the end of the bow frame and showing a portion of the handle about to be secured to the bow frame end portion;

FIG. 14 is a longitudinal section of the bow frame and of the handle secured to the same;

FIGS. 15 and 16 show two additional removable handles to be used in conjunction with the bow frame of FIGS. 10 to 13;

FIG. 17 is a perspective view of a second embodiment of the support board; and

FIG. 18 is a partial cross-section taken along line 18—18 of FIG. 17.

In the drawings, like reference numerals indicate like elements throughout.

DETAILED DESCRIPTION OF THE PREFERRED EMBODIMENT

Figure 3:
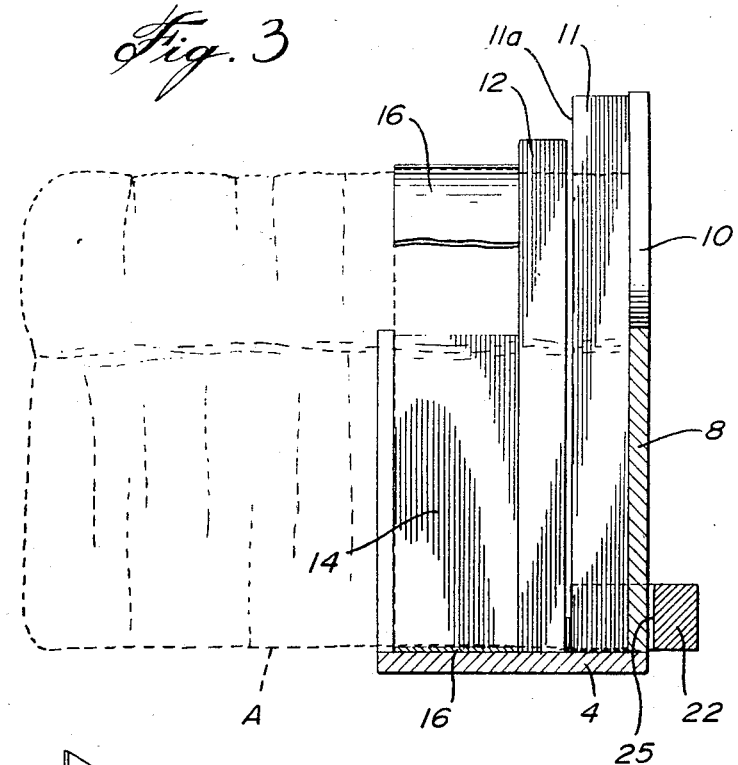
FIG. 3 is a longitudinal central section of the support board and a cross-section of the knife in operative position.
Figure 4:
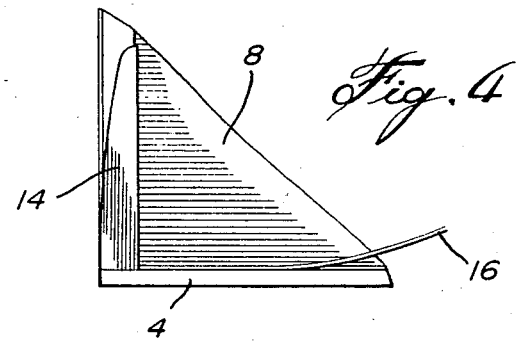
FIG. 4 is a partial end elevation showing one of the strap rest surfaces.

Referring to FIGS. 1 to 5, there is shown a first embodiment of the assembly of the invention comprising all the essential components thereof, namely: a support board 1, a knife 2 and the restraining means 3. The support board 1 comprises a small base plate 4, of generally rectangular shape, having a front edge 5, a rear edge 6 and side edges 7. An abutment wall 8 is secured to the base plate 4 at the rear edge 6. The top edge 9 of said abutment wall is provided with a deep central notch 10. A pair of posts 11 and 12 are secured to base plate 4 along each side edge 7 with the post 11 adjacent to and secured to the abutment wall 8 and the two posts defining a slot 13 therebetween, said slot extending upwardly from the base plate 4 and opening at the free end of the posts 11, 12. Posts 12 are shorter than posts 11 for a purpose to be explained hereinafter.

The slots 13 lie in a plane which is parallel to the plane of the inner surface of abutment plate 8 and which is at a horizontal distance from said abutment plate corresponding to the thickness of slices which are to be obtained.

A pair of upstanding legs 14 are secured to the base plate 4 adjacent each side edge 7 and front edge 5. Each leg 14 provides a slightly longitudinally convex external rest surface 15. The restraining means, generally indicated at 3, includes the legs 14 and a flexible strap 16 designed to form a loop around the loaf of bread to be sliced, this loaf of bread being indicated at A in FIG. 2. More specifically, one end 17 of the strap 16 is secured by a screw 18 (see FIG. 5) to the underface of a leg 14, the strap passing through a slot 19 formed between the underface of the leg and the top face of the base plate 4. The screw 18 is accessible through an opening 20 made in the base plate 4. The strap extends transversely of the base plate 4; then up along the opposite leg 14 on the inside thereof and then is made to surround the loaf of bread A in a loop, with the free end portion 21 of the strap resting on the rest surface 15, whereby the hand of the user holding the loaf of bread A in position on the board 1 with the front face of the bread loaf in abutment with the abutment plate 8, can have his fingers resting on top of the strap 16 with his thumb, as indicated at T, pressing the outer portion of the strap against the rest surface 15. In practice, the strap is maintained under slight tension around the loaf of bread, so that it will prevent deformation of the bread during slicing especially when the bread is fresh and soft.

Figure 5:
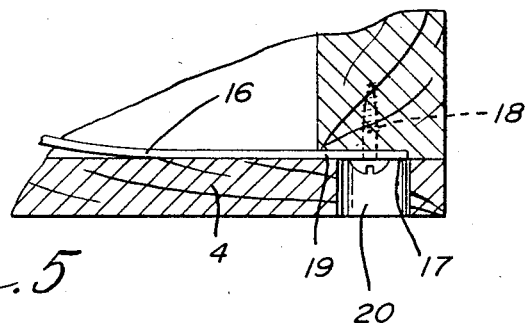
FIG. 5 is a partial cross-section of the right lower corner of the support board showing how one end of the strap is removably connected to the board.

In FIGS. 1, 2 and 5, it is seen that the arrangement is for a right-hand user with the user's left hand holding the loaf of bread on the support board. However, for a left-hand user, that is a user holding the knife 2 in his left hand, the support board can be converted for left-hand use, in which case the position of the strap 16 is reversed by simply unscrewing screw 18, pulling the strap 16 from slot 19 and reinserting the end 17 of the strap through the slot 19 of the opposite leg 14 and screwing back the end 17 by screw 18 into the latter leg 14. The strap will then form a loop in the reverse direction with its outer portion 21 adapted to overlie and be pinched against the rest surface 15 of the opposite leg 14, namely the left-hand leg 14, shown in FIG. 1, both legs being of identical construction. Once a slice of bread has been fully cut, it is a simple matter to remove the same between the abutment plate 8 and the front face of the loaf of bread A by inserting one's finger through notch 10 and pressing the bread slice against the knife blade and moving the same upwardly out of the support board. The support board just described is adapted to be made of a material, such as wood.

The slicing knife 2 includes a bow frame 22, of elongated shape, having inwardly inturned ends 23, 24 and an intermediate inside longitudinally straight face 25; a blade 26 is removably fixed at its ends by screws 27 to the end portions 23, 24 in such a manner so as to be held under tension. The plane of the blade is parallel to the plane of the inside surface 25. The blade 26 is spaced from the inside surface 25 a distance at least equal to the horizontal distance between slot 13 and the outside flat surface of the abutment wall 8. An elongated handle 30 is integrally formed with bow frame end 24. Said handle forms a step 31 overlying the blade 26, such that the longitudinal center line of the handle 30 will lie in the plane containing the blade 26. This will prevent a twisting force to be applied to the blade 26 when the same is worked back and forth through the loaf of bread while pressing down on the same.

The underside 32 of the handle 30 is upwardly offset from the lower edge of the blade 26, more particularly from the straight line joining the blade teeth, a sufficient distance, indicated at d in FIG. 2, to allow sufficient space for the user's fingers not to abut the support surface from which the board is resting when the blade is about to complete the slicing operation, with the blade having reached the bottom of the slots 13. The bow frame 22 and handle 30 of the knife 2 are designed to be made in a one-piece unit of a material, such as wood. The end of handle 30 has a looped string 30a to suspend the slicing knife when not in use.

For use of the slicing knife 2 with the support board 1 in accordance with FIGS. 1 to 3, one front end portion of the loaf of bread A is abutted against abutment wall 8 and the blade 26 is guided into the pair of slots 13 by applying the blade onto the exposed slot surfaces 11a of the posts 11. The loaf of bread is held in position by the strap 16, as previously described, and the slice of bread is cut by a back-and-forth descending movement of the blade 26 by operating handle 30. Removal of the cut slice is facilitated by the provision of notch 10, as previously noted. The tension on the loaf of bread is quickly released by simply ceasing to apply pressure on the end 21 of the strap 16 against the rest surface 15. The loaf of bread is moved against abutment plate 8 and the strap tensioned around the bread ready to cut another slice. It will be noted that during slicing, blade 26 is prevented from disengaging slots 13, contrary to a knife having a blade with a non-attached end.

FIGS. 6 to 9 show another embodiment of a slicing knife also designed to be made with a bow frame and handle in wood and adapted to selective left-hand or right-hand use, preferably in association with the full capabilities of the left-hand and right-hand use of the above-described support board.

The slicing knife of the second embodiment is generally indicated at 2' and comprises a bow frame 22' with symmetrical inwardly-turned frame ends 23', each having a lateral undercut face 33 to which the slicing blade 26 is attached under tension at its ends by means of wood screws 27. Each inturned end 23' is formed with V-shape end face 34 facing endwise of the bow frame; a screw hole 35 opens at the top face of each end portion 23'. A handle 30' has a front extension 36 with a flat underface 37 adapted to be fixed flat against the top face of anyone of the end portions 23' by means of the screw 38 extending through a hole of extension 36 into either screw hole 35. The handle further includes a downward extension 39 having a front face 40, of arrow-shape cross-section, adapted to match the V-shape recess 34 at either end portion 23'. Thus, the handle can be rigidly secured to either end of the bow frame 22', with the handle firmly retained in alignment with the blade 26, the centerline of the handle 30' again lying in the plane of the blade 26, as in the first embodiment. Furthermore, it is also noted that the underside face 32' of the handle 30 is vertically upwardly offset form the lower edge of the blade 26, so that the user's fingers will not touch the rest surface on which the support board 1 lies when the blade has reached the end of the slicing operation.

Slicing knife 2' is designed to be used with the support board 1 of FIG. 1 in the same manner as slicing knife 2.

FIG. 10 shows a third embodiment of a slicing knife in accordance with the invention. The bow frame and handle are adapted to be made of moldable material, such as plastic, for instance by an injection molding process. The slicing knife 2" is partially illustrated in FIGS. 10 to 14. It comprises a bow frame 41, of J-shape cross-section and of symmetrical shape, having symmetrical inturned end portions 42, only one being shown in the drawing, the other one being a mirror image of the one illustrated.

The bow frame end portions 42 each have an opposed notch 43 for the insertion of the respective ends of the blade 26 and within the opening 43, there is provided (see FIGS. 11 and 14) a hook member 44 for hooking the end of the blade by means of its conventional end opening. This hook protrudes from a face 45 which is substantially parallel to the inside face 41' of central portion of the bow frame 41, said faces 45 lying in a common plane at both ends of the bow frame. The central portion of the bow frame has an original camber which resiliently becomes straighter when the blade 26 is hooked onto the bow frame; thus, blade 26 is automatically held under tension. A handle 46 has at its inner end a flat underface 47 from which downwardly protrudes an L-shape snap member 48. The handle also is provided with a downward integral extension 49 making a right angle with the underface 47 and from which forwardly protrudes an L-shape snap member 50. Parts 47 to 50 serve to rigidly and removably secure the handle to the bow frame at either end thereof. For this purpose, snap member 48 is first engaged into an upwardly-opening aperture 51 made in the bow frame end portion 42 and the snap member 48 engages under a downwardly-facing shoulder 52 protruding in said opening 51. The L-shape snap member 50 engages with snap action underneath and around the lower edge of the end wall 53 defining the opening 51. Thus, the handle is maintained by a snap action at either end of the bow frame in rigid position with the longitudinal axis of the handle in the plane of the blade 26 and with the underface of the handle upwardly offset from the lower edge of the blade 26, as in the first two embodiments of the slicing knife and for the same reason.

It will be noted that in the secured position of the handle 46 to the bow frame 41, the underface 47 of the handle is retained firmly against the top face of the end portion 42 of the bow frame 41.

FIGS. 15 and 16 show additional shapes of handle, as shown at 46' and 46", respectively, each provided with the same connecting means 48 to 50 as handle 46 of FIG. 10 to FIG. 14, so as to be removably secured to either end of the same bow frame 41. Both handles 46' and 46" are characterized by an upwardly-extending handle grip 54, 55, respectively, designed to be conveniently grasped by a person in a wheel-chair using the knife over a kitchen counter and with or with the support board of the invention.

In FIG. 15, the hand opening 56 is closed at its upper end while in FIG. 16, the handle grip 55 is completely free at its upper end for easier hand-insertion.

FIGS. 17 and 18 show another embodiment of the support board; more particularly, it is designed to be made of moldable material, such as synthetic resin, and also by injection molding.

As in the first embodiment, the board 1' has a base plate 4', an upstanding abutment wall 8' at one end provided with a bread slice-releasing notch 10' opening at the top edge 9' of the abutment wall 8' centrally of the same. Base plate 4' tapers in a direction away from abutment wall 8', so as to facilitate the insertion of a loaf of bread on the base plate 4'. The lateral posts 11' are integrally formed with the abutment wall 8' and the base plate 4', while the posts 12' are integrally formed with the base plate 4' but are of an L-shape cross-section with outwardly-extending flanges 12" to reinforce the same. As in the first embodiment, posts 11', 12' define therebetween a guiding slot 13' for the slicing blade of the knife, so as to cut a slice of bread of uniform thickness and with successive slices of equal thickness. Also, posts 11' have an exposed slot surface 11'a to facilitate blade insertion into slots 13'.

Base plate 4' has upstanding legs 14', of similar symmetrical construction, each providing an external longitudinally convex rest surface 15' which are recessed with respect to flanges 12" and another outwardly-extending flange 57, so that flanges 12" and 57 form guiding surfaces for the outer end 21 of the strap 16 when said outer end 21 is pressed by the user's thumb T against the rest surface 15', as previously explained in relation to FIGS. 1 and 2.

Base plate 4' is further provided with side walls 58 extending rearwardly from the legs 14' for further guiding the loaf of bread in position onto the board. The top face of base plate 4' has a transverse groove 4'a of a width and depth about equal to the width and thickness of strap 16 to receive the latter flush with said top face. The strap is thus retained against lateral movement and does not impede sliding movement of the loaf of bread A on base plate 4'. As in the first embodiment, the position of the restraining strap 16 can be reversed for right-hand or left-hand use, but this is now done without having to use a retaining screw, such as screw 18 shown in FIG. 5. As shown in FIG. 18, each leg 14' is hollow for receiving the inner end 17 of the strap 16; said hollow gradually tapers towards the upper end of the leg 14', so that pushing of the strap into the hollow will eventually cause gripping of the inner end of the strap within the hollow. Furthermore, the lower end 59 of the inner wall of the leg 14' extends down at least to the level of the bottom face of the groove 4'a, so that a portion of the strap passed through opening 19' between said leg and the base plate, will have to make a sharp turn to extend upwardly within the hollow of the leg, whereby normal pulling of the strap will not release the same from within the leg 14'. To remove the strap inner end, it is necessary to extract the strap from the bottom opening 20' made in the base plate and in communication with the leg hollow. Thus, it is a simple matter to reverse the position of the restraining strap.

In order to facilitate complete cutting of a bread slice, the top surface of the base plate 4' is provided with a groove 60 in alignment with the slots 13', so that the cutting teeth of the knife blade may engage said groove 60 at the end of the slicing operation.

Handle 46 has a through hole 46' at its free end to hand the slicing knife when not in use.

What I claim is:

1. A slicing knife comprising a bow frame having inturned ends, a straight, elongated blade having a top longitudinal edge and cutting teeth formed along its bottom edge, said blade extending between and attached at its ends under tension to said bow frame ends, with the plane of said blade normal to the plane of said bow frame, the latter having an underside which does not downwardly protrude from said cutting teeth when said blade lies in a vertical plane, and a substantially straight, elongated handle extending away from one of said bow frame ends, said handle having its longitudinal axis lying in the plane of said handle and having an underface which is upwardly offset from a straight line joining the cutting teeth of said blade a distance which is at least twice the blade width to permit finger insertion between the handle and a surface on which the cutting teeth rest.

2. A slicing knife as defined in claim 1, wherein the bow frame end portion to which said handle is connected defines an end recess against which one end of said blade is fixed, so that the longitudinal axis of said handle may lie in the plane of said blade.

3. A slicing knife comprising a bow frame having inturned end portions, a straight, elongated slicing blade having a top longitudinal edge and cutting teeth formed along its bottom edge, blade attaching means fixing the respective ends of said slicing blade to said end portions with said blade lying in a plane normal to the plane of said bow-shaped frame, said bow frame having a top side which protrudes from the top edge of said blade and an underside which does not downwardly protrude from said cutting teeth when said blade lies in a vertical plane, similar first coupling means carried by both said bow frame end portions and a handle having at one end a second coupling means arranged to match either one of said first coupling means to removably and selectively secure said handle to either one of said bow frame end portions, with the longitudinal axis of the handle lying in the plane of said blade.

4. A slicing knife as defined in claim 3, wherein said first and second coupling means includes screw means removably interconnecting the handle to ether bow end portion and mating surface portions at said bow end portions and at said one end of said handle for firmly retaining the handle with its longitudinal axis in the plane of said blade.

5. A slicing knife as defined in claim 3, wherein said second coupling means include snap members formed on said one end of said handle and said first coupling means including matching surfaces for a removable snap connection with said snap members.

6. A slicing knife as claimed in claim 5, wherein said bow frame is resilient and has an initial camber, said blade attaching means including hook means formed on said bow frame end portions removably engaging holes in the ends of said blade, attachment of the ends of said blade to said hook means decreasing the bow frame camber to maintain said blade under tension.

7. The slicing knife as defined in claim 5, wherein said handle has a hand grip which extends upwardly from said handle one end and from the plane of said bow frame.

8. A support board for supporting a mass of food for slicing the same into slices of equal thickness, comprising a base plate, an upstanding abutment wall at one end of said base plate, upstanding lateral guides adjacent said abutment wall and at each side thereof, said abutment wall as high as said lateral guides, each guide having a vertical slot extending upwardly from the base plate and opening at the ends of the guide, the slots being in a plane parallel to said abutment wall and a distance selected in accordance with the thickness of the slice to be cut, said abutment wall having an outer face opposite said facefacing said slot, said outer face being free of any obstruction, said support board adapted to be used in association with a slicing knife of the type including a resilient bow frame having inturned opposite ends and a slicing blade secured at its ends to said opposite ends of said bow frame and retained under tension, said blade adapted to engage said slot with said bow frame on the exterior of said abutment wall, and wherein said support board further includes a flexible strap member having one end attached to said support board, said strap extending transversely of said base plate beyond said slots with respect to said abutment wall, said strap having such a length that it is capable to form a loop around a mass of food held on said base plate, and means to enable holding the free end portion of said strap in tensioned condition around said mass of food.

9. A support board as defined in claim 8, wherein said last-named means include a leg upstanding from one side of said support board and defining an exterior rest surface, said strap free end portion adapted to be pressed against said rest surface by the user's hand.

10. A support board as defined in claim 9, further including a second leg upstanding from the opposite side of said base plate and in transverse alignment with said first-named leg, said second leg being symmetrical to said first-named leg and being a mirror image of the same, and having an exterior rest surface, said strap being reversibly attachable to said support board in the region of the lower end of one or the other of said legs, with the free end portion of said strap adapted to be applied against the rest surface of one or the other of said legs for right-hand or left-hand use of said support board.

11. A support board as defined in claim 10, wherein each of said legs is of hollow construction, with said hollow opening at the underface of said base plate and also through a slot at the top face of said base plate, said strap engageable through said slot and insertable into said hollow to be releasably retained to anyone of said legs.

12. A support board as defined in claim 8, wherein the top face of said base plate has a transversely-extending groove of a width and depth about equal to the width and thickness of said strap to receive the portion of said strap proximate to its attached end.

13. A support board for supporting a mass of food for slicing the same into slices of equal thickness, comprising a base plate, an upstanding abutment wall at one end of said base plate, upstanding lateral guides adjacent said abutment wall and at each side thereof, said abutment wall as high as said lateral guides, each guide having a vertical slot extending upwardly from the base plate and opening at the ends of the guide, the slots being in a plane parallel to said abutment wall and a distance selected in accordance with the thickness of the slice to be cut, said abutment wall having an outer face opposite said face facing said slot, said outer face being free of any obstruction, in combination with a slicing knife comprising a bow frame having a straight intermediate portion and inturned end portions, a knife blade extending between and attached at its ends under tension to said bow frame end portions, with the plane of said blade normal to the plane of said bow frame, a handle extending from one end of said bow frame, said handle having a longitudinal axis lying in the plane of said blade, said bow frame intermediate portion having a face proximate to said blade which is straight and spaced from said blade a distance sufficient for said blade to engage said slots with said bow frame on the exterior of said abutment wall and wherein both said bow frame end portions have similar handle coupling means and said handle has matching coupling means at one end, whereby said handle can be removably and selectively secured to anyone of said bow frame end portions by said handle coupling means and said matching coupling means, with the handle longitudinal axis lying in the plane of said blade.

14. A combination support board and slicing knife of claim 13, wherein said support board further includes a flexible strap member having one end attached to said support board, said strap extending transversely of said base plate above the same and beyond said slots with respect to said abutment wall, said strap having such a length that it is capable to form a loop around the mass of food held on said base plate and means to enable holding the free end portion of said strap in tensioned condition around said mass of food.

15. The combination support board and slicing knife of claim 14, wherein said last-named means include a leg upstanding from one side of said base plate and defining an exterior rest surface, said strap free end portion adapted to be pressed against said rest surface by the user's hand.

16. The combination support board and slicing knife as defined in claim 15, wherein said support board further includes a second leg upstanding from the opposite side of said base plate and in transverse alignment with said first-named leg, said second leg being symmetrical to said first-named leg and being a mirror image of the same, and having an exterior rest surface, said strap being reversibly attachable to said support board in the region of the lower end of one or the other of said legs, with the free end portion of said strap adapted to be applied against the rest surface of one or the other of said legs for right-hand or left-hand use of said support board.

17. The combination as defined in claim 16, wherein each of said legs is of hollow construction, with said hollow opening at the underface of said base plate and also through a slot at the top face of said base plate, said strap engageable through said slot and insertable into said hollow to be releasably retained to anyone of said legs.

18. The combination as defined in claim 17, wherein said abutment wall has a top end and has a central notch downwardly extending from said top edge and opening at the latter.

19. The combination as defined in claim 18, wherein each lateral guide has a slot surface facing away from said abutment wall which is exposed at its top portion to facilitate blade insertion into said vertical slots.

20. The combination as defined in claim 19, wherein said base plate tapers in a direction away from said abutment wall.

21. The combination as defined in claim 20, wherein the top face of said base plate has a transversely-extending groove of a width and depth about equal to the width and thickness of said strap to receive the portion of said strap proximate to its attached end.

* * * * *